United States Patent
Melsa

(10) Patent No.: US 7,110,445 B2
(45) Date of Patent: Sep. 19, 2006

(54) OVERSAMPLED CLIP-SHAPING

(75) Inventor: Peter J. Melsa, Niles, MI (US)

(73) Assignee: Texas Instruments Incorporated, Dallas, TX (US)

( * ) Notice: Subject to any disclaimer, the term of this patent is extended or adjusted under 35 U.S.C. 154(b) by 813 days.

(21) Appl. No.: 09/940,950

(22) Filed: Aug. 28, 2001

(65) Prior Publication Data

US 2003/0043895 A1    Mar. 6, 2003

(51) Int. Cl.
*H04B 3/46* (2006.01)
(52) U.S. Cl. .................... 375/224; 375/287; 375/346; 375/377; 370/286; 327/58; 327/309; 327/310
(58) Field of Classification Search ........... 375/222, 375/224, 229, 232, 254, 260, 295, 285–287, 375/346, 350, 353; 341/139, 132, 179; 708/290; 320/162–164; 327/58, 62, 309, 310, 91; 702/87, 190; 369/59.22; 370/288; 379/406.07
See application file for complete search history.

(56) References Cited

U.S. PATENT DOCUMENTS 5,293,369 A * 3/1994 Melas et al. ............. 369/59.22
5,668,794 A * 9/1997 McCaslin et al. ........... 370/288
5,873,054 A * 2/1999 Warburton et al. ......... 702/190
6,166,567 A * 12/2000 McCullough ................ 327/91
6,597,746 B1 * 7/2003 Amrany et al. ............. 375/296
6,609,075 B1 * 8/2003 Warburton et al. ........... 702/87
2001/0031014 A1 * 10/2001 Subramanian et al. ...... 375/260

* cited by examiner

*Primary Examiner*—Khai Tran
*Assistant Examiner*—Edith Chang
(74) *Attorney, Agent, or Firm*—Steven A. Shaw; W. James Brady; Frederick J. Telecky, Jr.

(57) ABSTRACT

The present invention provides an apparatus, system and method of peak-to-average reduction of an oversampled signal for a digital communication system. Peak detection 504 and width measurement 504 are advantageously combined in which a peak portion or multiple peak portions of an input signal that exceeds a predetermined threshold is detected and a width of the peak portion is determined. The peak detection and width measurement are further combined with a novel variable width shape generation methodology 506 in which a variable width shaping response is applied 510 to the peak portion responsive to the peak portion width. Additionally, a novel receiver technique 1390 can be included to reduce or eliminate the upstream BER impact using downstream oversampled shaping.

21 Claims, 6 Drawing Sheets

OVERSAMPLED CLIP-SHAPING

BACKGROUND OF THE INVENTION

1. Technical Field of the Invention

The present invention relates generally to transmission systems and, more particularly, to an apparatus, system and method for clip-shaping in such systems.

2. Background of Related Art

Transmission systems using multicarrier modulation are becoming increasingly important. An example of a transmission system using multicarrier modulation is an Asymmetric Digital Subscriber Line (ADSL). Some ADSL modems use DMT, a multi-carrier modulation technique, to achieve high bandwidth efficiency. An ADSL transceiver system generally includes a modem at a central station or office adapted to transmit information in a down-stream signal to a modem at a remote terminal and to receive information in an up-stream signal transmitted by the modem at the remote terminal. Modems generally include a transmitter section and a receiver section isolated by a hybrid. The up-stream and down-stream signals pass through a common transmission medium, typically a twisted-pair telephone line. These type of transmission systems typically have a transmitted signal with a higher peak-to-average ratio (PAR) than single carrier transmission system, and thus generally require components with high precision and high power consumption.

Some current systems attempt to limit PAR levels by hard-clipping the transmitted signal, however, several problems can arise from current clipping techniques. For example, in an effort to reduce a transmitted peak, split peaks can result which subsequently can cause peak growth and/or re-growth near the original peak. Further, as a signal's peak width varies and as peaks occur closely together, PAR reduction becomes more difficult and can lead to bit errors which increases the bit error rate of transmissions.

SUMMARY OF THE INVENTION

The present invention achieves technical advantages as an apparatus, system and method of peak-to-average reduction of an oversampled signal for a digital communication system. Peak detection and width measurement are advantageously combined in which a peak portion of an input signal that exceeds a predetermined threshold is detected and a width of the peak portion is determined. The peak detection and width measurement are further combined with a novel variable width shape generation methodology in which a variable width shaping response is applied to the peak portion responsive to the peak portion width. Additionally, a novel receiver technique can be included to reduce or eliminate the upstream BER impact using downstream shaping.

In another embodiment, peak detection and width measurement are advantageously combined in which multiple peak portions of an input signal that exceed a predetermined threshold are detected and a width of each peak portion is determined. Further, a variable width shaping response is applied to the respective multiple peak portions. Additionally, a novel receiver technique can be include to reduce or eliminate the upstream BER impact using downstream shaping for the multiple peak portion approach.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

There are several issues which need to be considered when considering a time-domain approach such as clip-shaping. For example, the height, width, shape and separation of peaks are almost limitless. Additionally, the reduction of one peak, if not done properly, has the ability to create additional peaks and desired signal changes to realize PAR reduction need to be maintained through any subsequent filtering operations.

Figure 1:
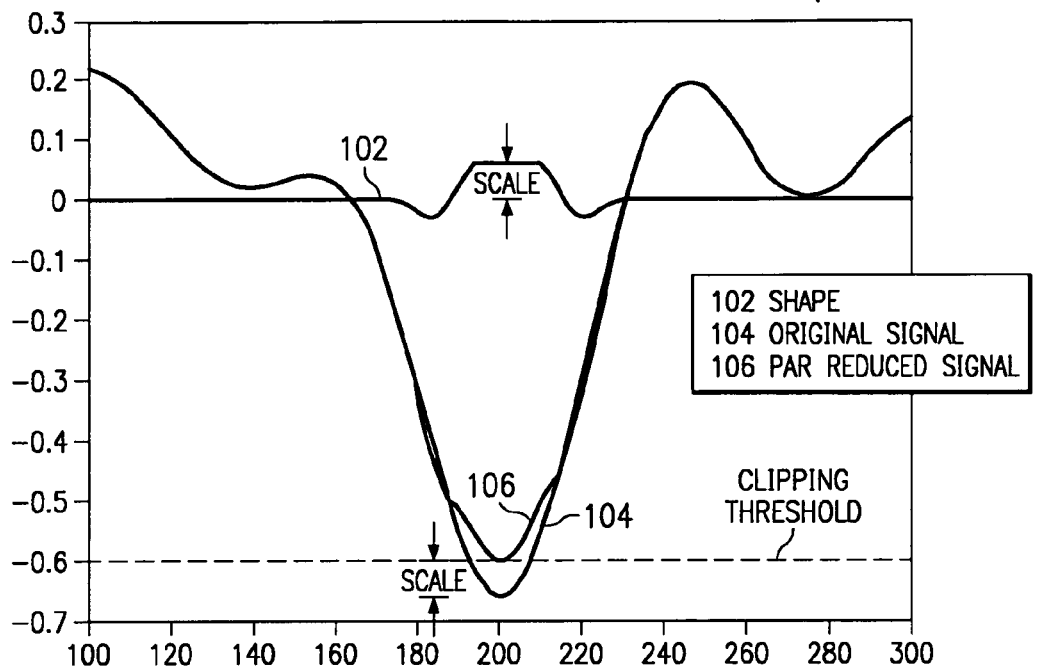
FIG. 1 is a graphical representation of a basic concept of clip-shaping in accordance with an exemplary embodiment of the present invention.

FIG. 1 illustrates a graphical representation of a basic concept of clip-shaping. Though this basic approach may be well suited for a single sample, it does not address problems associated with multiple samples in an oversampled approach, for example. The present invention can be successfully practiced in such an oversampled approach. First, find a sample (changed to peak for over-sampled version) whose value is greater than the clipping threshold 104. Given a maximum PAR supported in a transmitter, the clipping threshold represents the largest signal value allowed. Then, add an appropriate clip shaping response (a.k.a. "shape") 102 scaled by (threshold-peak) to reduce the peak and shape the noise into nearby samples. The PAR reduced signal is shown as item 106. The intent is to provide spectral shaping of the clipping noise. If not shaped, then a clip appears as an impulse that has a flat spectral response. By shaping, the noise can be shaped into the higher frequencies where it is less damaging with respect to bit errors.

Figure 2:
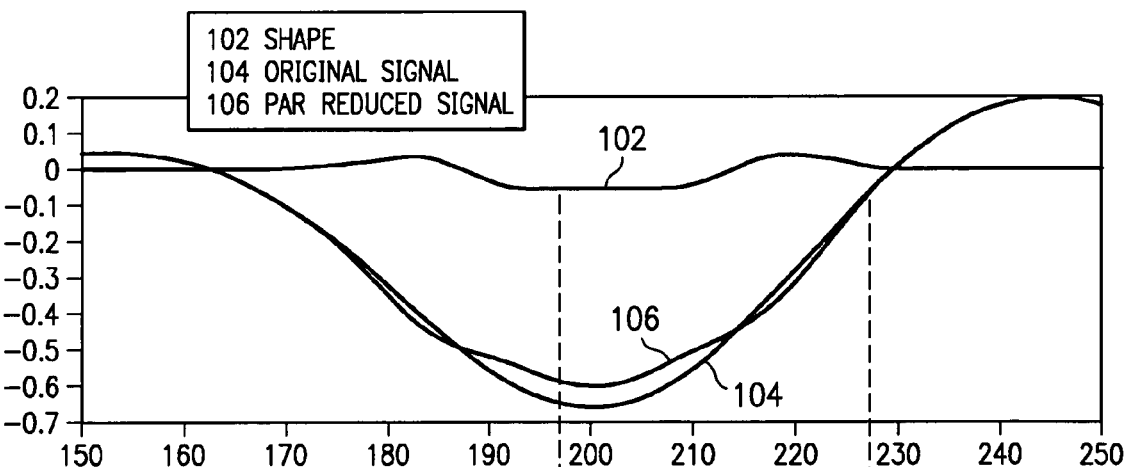
FIG. 2 illustrates a simple VLSI implementation of a single stage of PAR reduction clip-shaping in accordance with an exemplary embodiment of the present invention.
Figure 2:
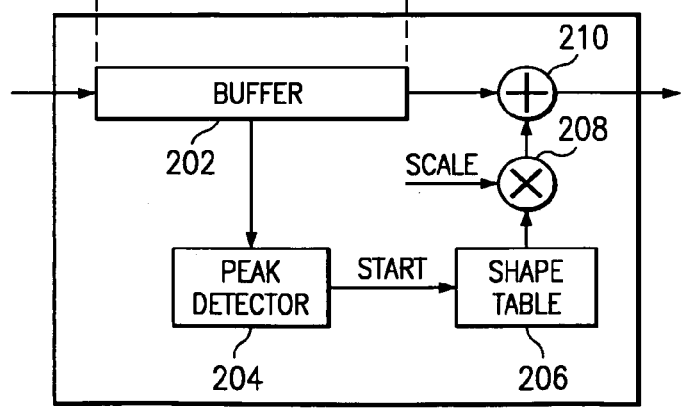

FIG. 2 illustrates a simple VLSI implementation of a single stage of PAR reduction clip-shaping in accordance with an exemplary embodiment of the present invention. The sample stream to which clip-shaping is to be applied is fed into a delay buffer 202 whose length is at least ½ the length of the shape 102. This allows a peak detector 204 to detect a peak and be able to signal the synchronization of the application of the shape 102 to the detected peak. As shown in FIG. 1, the scale factor operator 208 is (threshold-peak). A shape-table 206 stores contains the shape being utilized and is sequentially read by support logic. For a symmetric shape, the storage requirements for the shape can be halved. Preferably, the shape is fixed and is not varied from modem-to-modem or connection-to-connection in this basic clip-shaping approach. The shape is applied to the original signal 104 from the adder 210.

Figure 3:
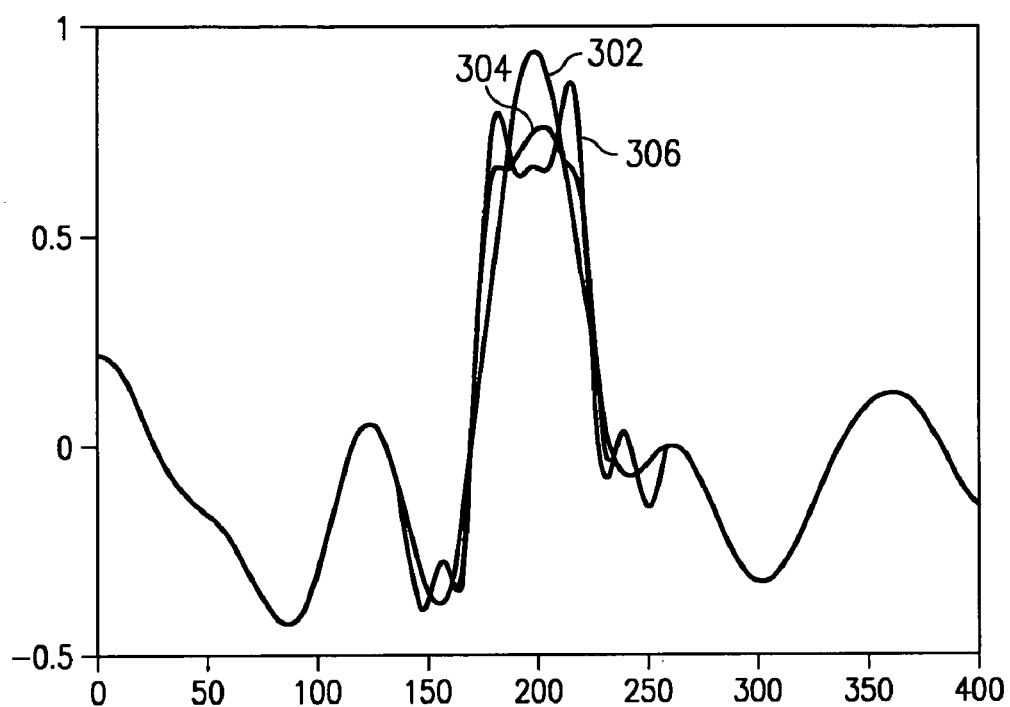
FIG. 3 illustrates a possible split peak scenario from an applying a reduction shape that is too narrow.

When clip-shaping is operating on oversampled signals there are a number of problems that may arise. For example, FIG. 3 illustrates a problem that can arise if the shape used to reduce a peak is too narrow. The original peak 302 is reduced but in the process creates two peaks 306 near each other, a.k.a. "split" peaks. If these "split" peaks are subsequently reduced they may cause peak growth near the original peak 304.

Figure 4:
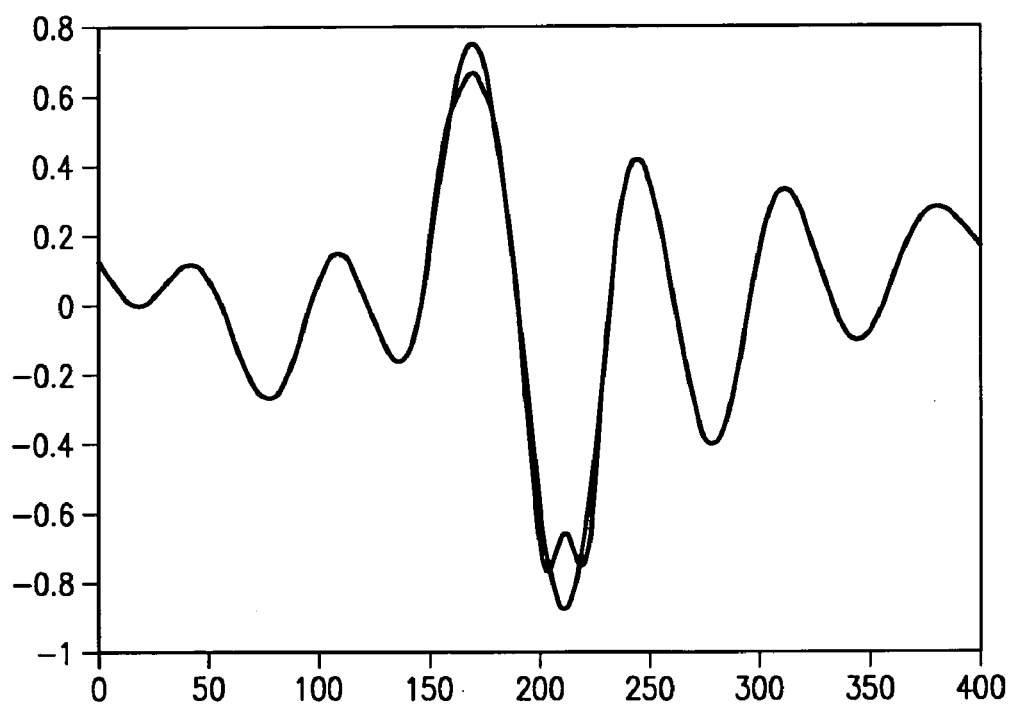
FIG. 4 illustrates multiple signal peaks appearing in close proximity.

Also, a wide peak may have a very flat top. If the shape is not at least as flat, a portion of the peak will remain above the threshold after PAR reduction is applied. Further, two peaks can occur very near each other, as illustrated in FIG. 4. In this circumstance it can be expected that they will be of opposite sign (otherwise they would have combined into one wider peak). Finally as shown in the figure, each peak needs to determine the width of its own shape. Otherwise one risks reducing one and splitting the other.

Figure 5:
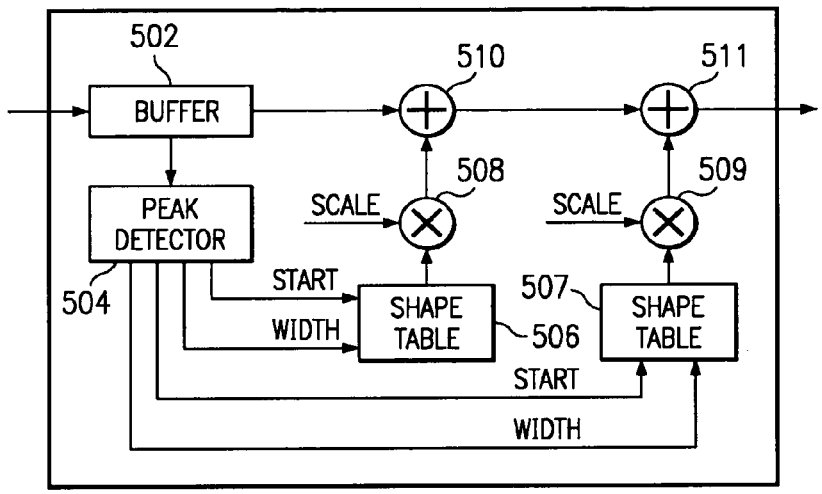
FIG. 5 illustrates an enhanced oversampled clip-shape device in accordance with an exemplary embodiment of the present invention.

FIG. 5 illustrates an enhanced oversampled clip-shape device in accordance with an exemplary embodiment of the present invention. The device includes a delay buffer 502 to which a sample stream is applied. Two shape tables 506, 507 (with respective scale units 508, 509 and adders 510, 511) are included to enable application of multiple shapes. Although nominally the peak detector 504 is operable to signal the synchronization or start of an applied shape where a peak occurs, peak detector logic associated with the peak detector 504, based upon the actual shape used, enables application of multiple shapes some minimal distance apart (more on this below). The peak detector 504 is further operably configured to measure the width of peaks which can be used to enable modification of a shape that is to be applied.

Figure 6:
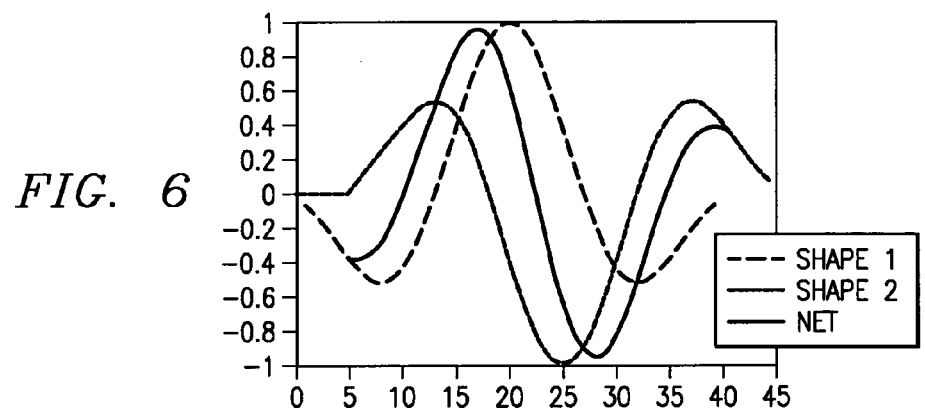
FIG. 6 illustrates the possible detrimental effect on PAR reduction as a result of improperly spaced competing applied shapes.
Figure 7:
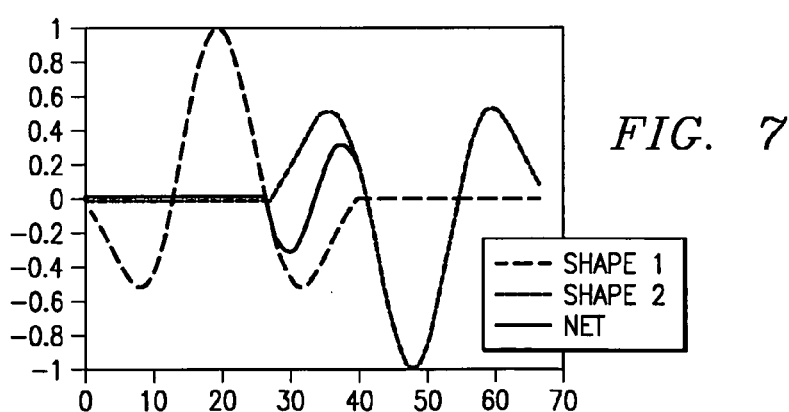
FIG. 7 illustrates PAR reduction for properly spaced applied shapes.

As shown earlier, overlapping shapes are required to handle nearby peaks. In accordance with an embodiment of the present invention, only one buffer is advantageously used to enable application of a second shape offset by some number of samples. However, since each applied shape moves energy into nearby samples it is possible that the two shapes could end up competing, as illustrated in FIG. 6. When that happens PAR reduction may not be achieved. However, if they are adequately spaced PAR reduction is achieved, as illustrated in FIG. 7. It is necessary to use a shape that supports simultaneous application near enough to handle (i.e., reduce both peaks) expected nearby double peaks.

Figure 8:
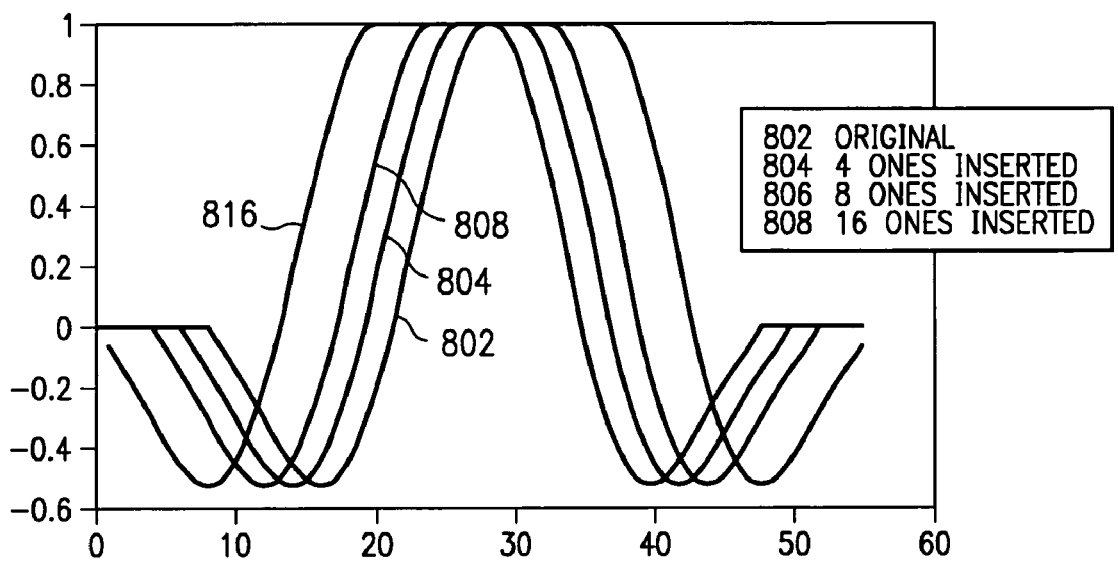
FIG. 8 is a graphical representation of a exemplary shape and corresponding shapes with the width widened by four "ones", eight "ones", and sixteen "ones" in accordance with an embodiment of the present invention.

The shape tables 506, 507 are further operable to generate shapes having variable widths in response to the widths of detected peaks. A predetermined or desired shape (assume odd-length symmetric) stored in a shape table 506, 507 is used and additional pairs of "ones" are inserted in the center of the shape to widen the peak. FIG. 8 illustrates a graphical representation of an predetermined shape 802 and corresponding shapes with widths widened by four "ones" 804, eight "ones" 808, and sixteen "ones" 816. This method easily adapts the "applied" shape (applied at adder 510 or 511) to the width of the actual detected peak. Further the "applied" shape is perfectly flat. This variable width shape approach lends itself to an easy VLSI realization and provides good noise shaping characteristics. Although various blocks are shown as discrete units, it should be appreciated that the functions represented by these blocks can in practice be carried out in a variety of different manners. In particular, it is observed that a number of these functions may most conveniently be carried out by one or more digital signal processors.

The width of a peak is estimated by the peak detector 504 by counting the number of samples (N+1) above the clipping threshold up to and including the peak. Using an assumption of a smooth and continuous signal, the peak can be determined by comparing it to the sample on each side. The number of "ones" to be inserted is thus 2*N.

Figure 9:
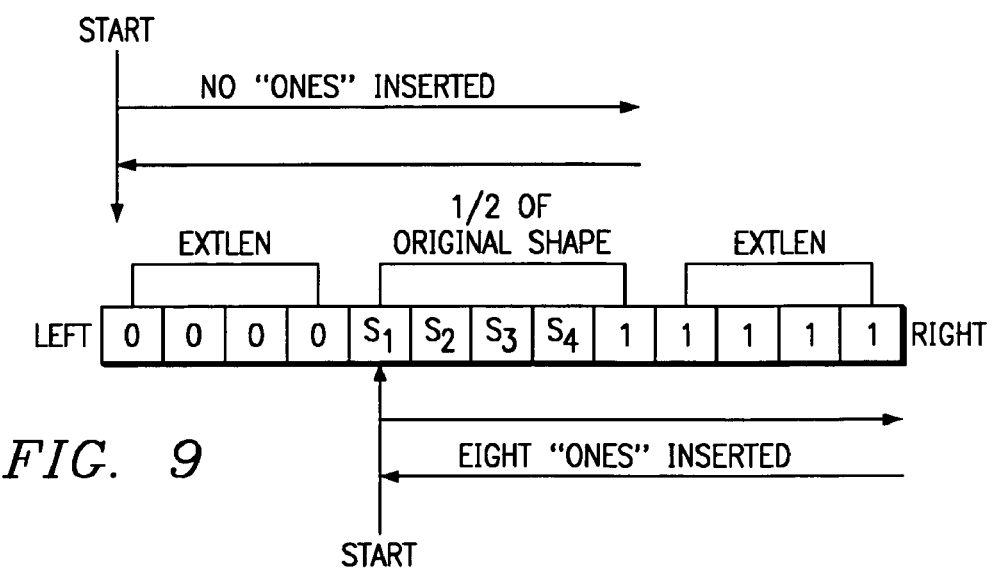
FIG. 9 illustrates a method to generate a variable width shape in accordance with an exemplary embodiment of the present invention.

FIG. 9 illustrates a simple method to generate such a variable width shape. The original shape, $\{s_1 \ldots s_L\ 1\ s_{L-1} \ldots s_0\}$, is an odd-length symmetric shape of length 2*L+1. This shape represents the narrowest shape that can be applied. The sequence $\{s_1 \ldots s_L\ 1\}$ is pre-pended with extlen "zeros" and appended with extlen "ones", where 2*extlen is the maximum number of "ones" that can be inserted. The "applied" shape is varied in width by modifying the start location for reading the table. Regardless of the start location, the same number of values (2*L+1+2*extlen) is read from the table. The table is read from the starting point towards the right for extlen+L+1 values and then back to the left for extlen+L values ending at the original starting location. FIG. 9 illustrates two examples. The first example has a starting location of 0 and thus generates the original shape (no "ones" are inserted). The second example has a starting location of 4 and thus widens the peak via eight "ones".

The applied shape should satisfy the constraint sum( )=0 to ensure that energy at DC is zero. If it is assumed that the original shape satisfies $2*(s_1+ \ldots s_L)+1=0$, then the above-described generation method has sum( )=2*N, again where 2*N is the number of "ones" inserted. Therefore, an offset must be added to the "applied" shape, where the offset is defined as:

offset=2N[−1/(2L+1+2extlen)].

The offset can be determined via a left-shift by 2N bits of a nominal offset, i.e. −1/(2L+1+2extlen). So that the "applied" shape has the proper peak value of (threshold−peak), it must be scaled by:

scale=(threshold−peak)[1/(1+offset)].

Figure 10:
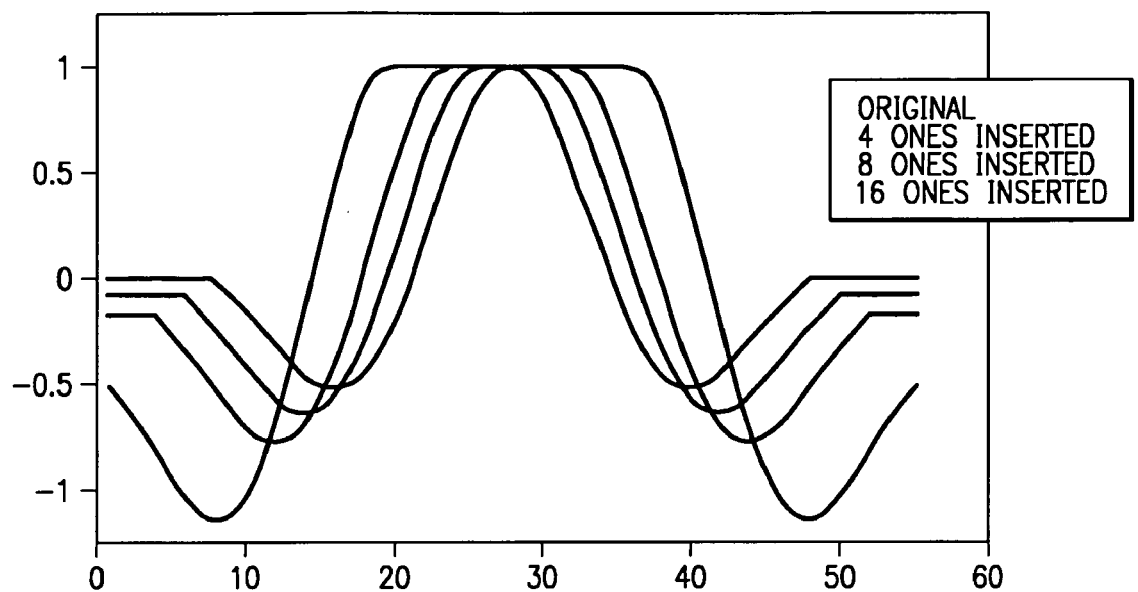
FIG. 10 is a graphical representation of a exemplary shape and corresponding shapes with the width widened by four "ones", eight "ones", and sixteen "ones" in accordance with the method illustrated in FIG. 9.

FIG. 10 shows the example shape widths illustrated in FIG. 8 having been adjusted as described above.

Figure 11:
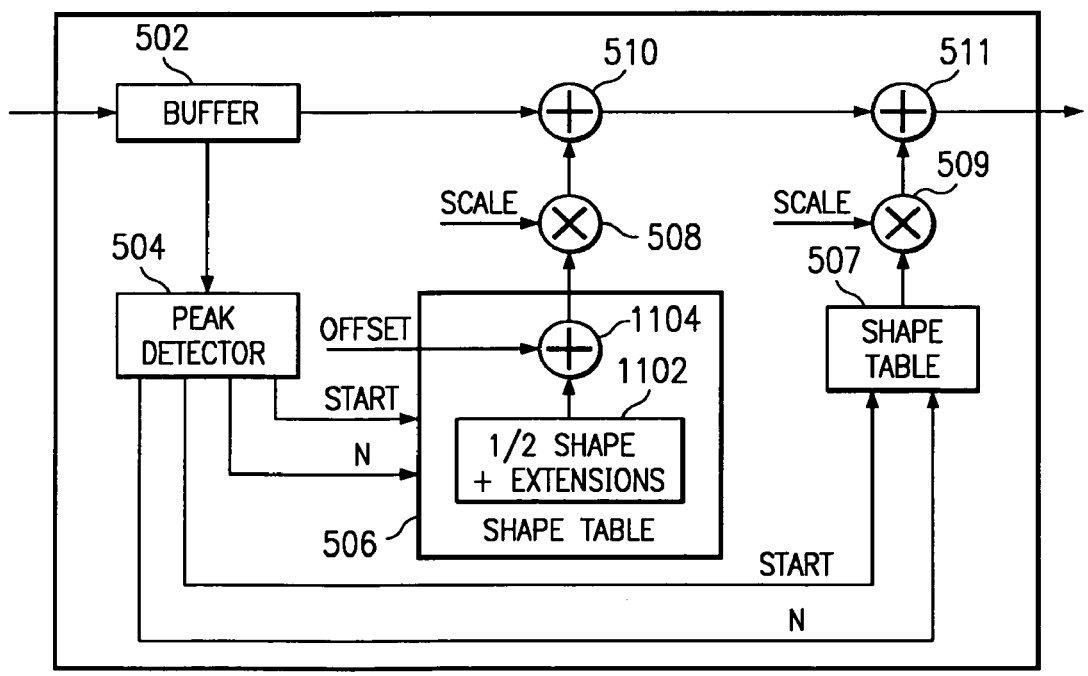
FIG. 11 illustrates an oversampled clip-shaping PAR reduction stage in which the shape table includes a "½ shape+extension" operation unit and an "offset" operation unit in accordance with an exemplary embodiment of the present invention.

FIG. 11 illustrates an oversampled clip-shaping PAR reduction stage in which the shape table 506 includes the above-described "½;2 shape+extension" operation unit 1102 and the offset operation unit 1104. It should be noted that shape table 507 can also include the "½ shape+extension" operation unit 1102 and the offset operation unit 1104. This embodiment enables two shapes that can be applied simultaneously with different widths.

Since downstream symbols are not aligned in any particular way with upstream symbols in an ADSL system, there is some probability that a shape via an echo path can cross two upstream symbol boundaries. When this occurs, the spectral characteristics of the echoed shape are not necessarily preserved. To address this type of problem, a novel shape-canceller (pseudo-echo canceller) is introduced which operates when shapes are applied and then only on the shape itself. There are some unique properties to the above-described oversampled clip-shaping shape generation methodology which can advantageously be utilized for a simple and efficient implementation of the shape-canceller.

Figure 12:
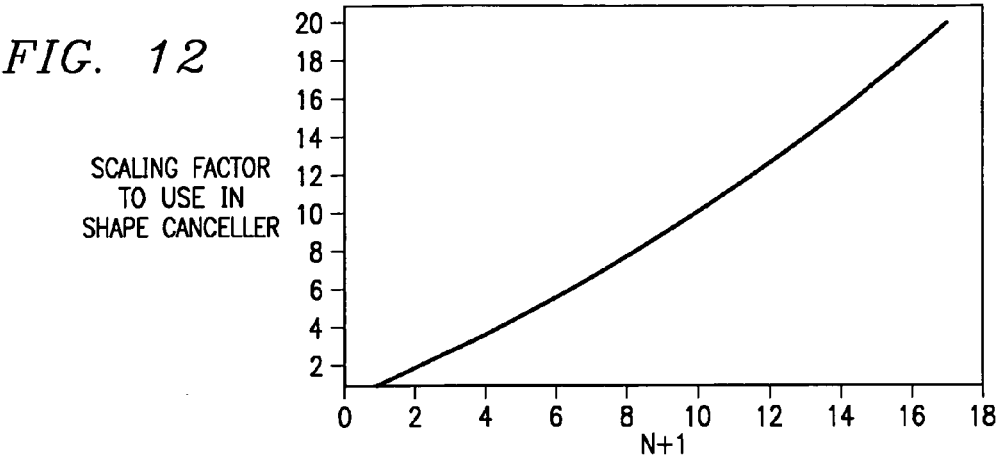
FIG. 12 shows actual scale factors as a function of N+1 in accordance with an exemplary embodiment of the present invention.

"Applied" shapes of various widths (i.e. 2N+1, where 2N is the number of inserted "ones") through the echo path of a typical ADSL modem result in scaled versions of each other. The deviation from this scaling is greatest where the signal is nearest to zero. This implies that if the response of the "original" shape through the echo path is known that the wider shapes can be generated simply as scaled versions. While this may be counter-intuitive at first, it does make sense. With respect to the passband of the echo path, the frequency response of the various width shapes are related largely by scale factors. As such, the time domain responses are also related by scale factors. FIG. 12 shows the actual scale factors as a function of N+1.

Figure 13:
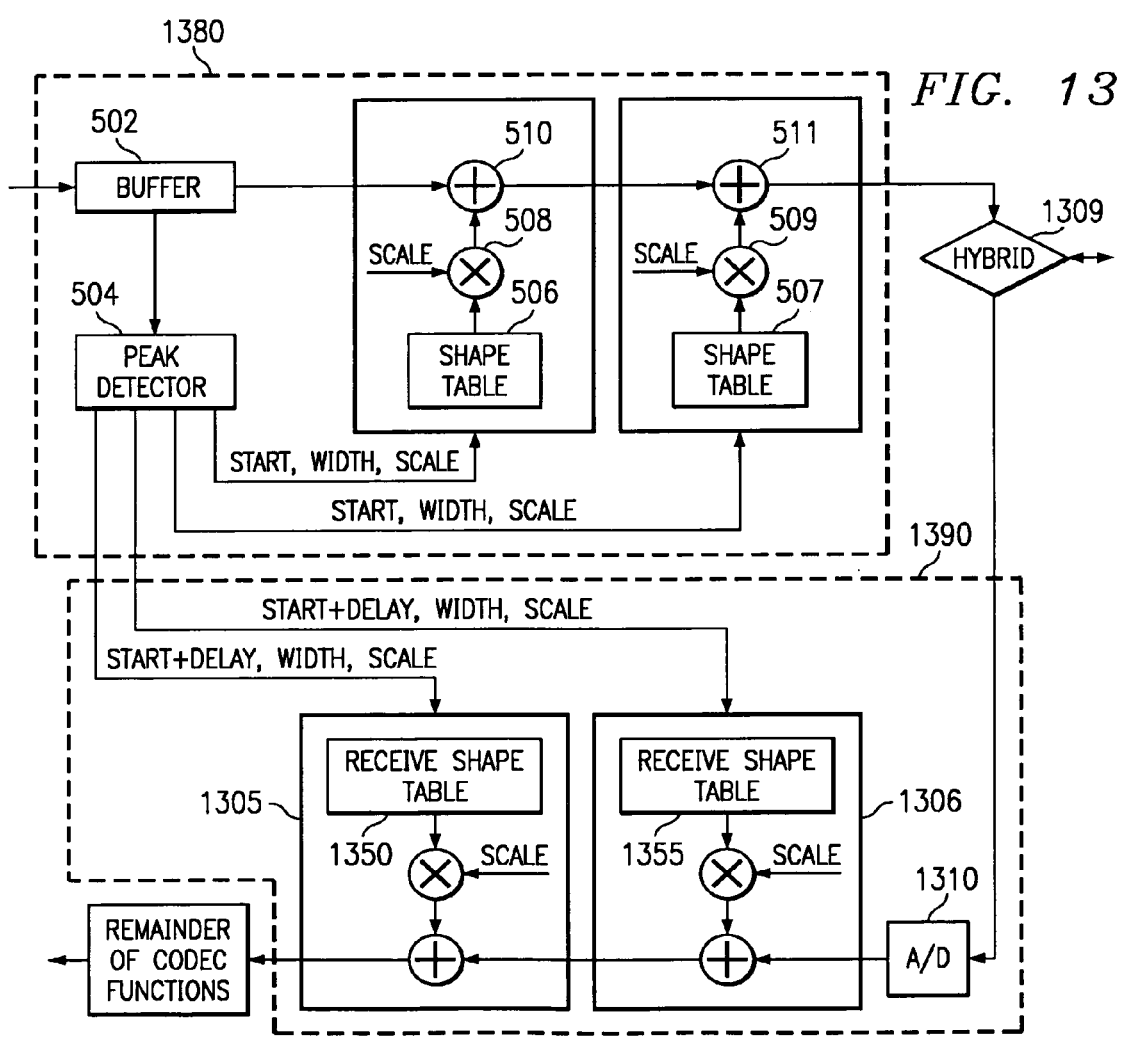
FIG. 13 illustrates a transceiver with an oversampled clip-shaping PAR reduction algorithm in conjunction with a shape-canceller in accordance with an exemplary embodiment of the present invention.

FIG. 13 illustrates a transceiver with an oversampled clip-shaping PAR reduction algorithm in conjunction with a shape-canceller in accordance with an exemplary embodiment of the present invention. Currently, modems are used to transfer data through a communication media, such as a twisted pair telephone line, in which each modem includes a transmitter section and a receiver section isolated by a hybrid. The transceiver of the present invention includes a transmitter portion 1380 (which includes clip-shaping PAR reduction) and a receiver portion 1390 (which includes shape-cancellers 1305, 1306) isolated by a hybrid 1309. The shape-cancellers 1305, 1306 also include scale and adder units. The receiver portion 1390 can also include an A/D converter 1310. The shape-cancellers 1305, 1306 are functionally very similar to the clip-shaping PAR reduction of the transmitter portion 1380 with a few differences: first, there is no need for a delay buffer; second, the receive shape tables 1350, 1355 can not assume symmetry, and the shape generated only differs in scaling (where scaling can be determined from the width measurement in the transmitter portion 1380) as the corresponding transmit shape width is varied; third, there is no peak detector, instead, the shape-cancellers 1305, 1306 are triggered by the transmit peak detector 504 and runs a predetermined time later, where the delay is based upon the bulk delay in the echo path.

Although various blocks are shown as discrete units, it should be appreciated that the functions represented by these blocks can in practice be carried out in a variety of different manners. In particular, it is observed that a number of these functions may most conveniently be carried out by one or more digital signal processors.

During training, the received shape must be trained for each modem and each connection individually (as any number of well-known methods can be used to train this shape, they will not be discussed here). This differs from the transmit portion 1380 where the "applied shapes" do not vary from connection-to-connection or modem-to-modem.

FIG. 13 shows only two receive shapes simultaneously active, however, the number of active received shapes can be increased for specific applications. For example, as the impulse response duration of the hybrid 1309 increases, more active received shapes may be needed. However, additional active received shapes can use the same received shape and, thus, a great deal of sharing of logic or memory (i.e. die area) is enabled across a large number of modems.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of peak-to-average reduction of an oversampled signal for a digital communication system, comprising:
   detecting a first peak portion of the oversampled signal that exceeds a predetermined threshold;
   determining a width of said first peak portion;
   applying a first shaping response to said first peak portion, said first shaping response having a variable width;
   varying said first shaping response width responsive to said first peak portion width;
   determining a second peak portion of said input signal which exceeds said predetermined threshold;
   determining a width of said second peak portion; and
   applying a second shaping response to said second peak portion, wherein said second shaping response having a variable width responsive to said second peak portion.

2. The method of claim 1, wherein said first shaping response further having a variable scale factor determined by a difference of said predetermined threshold and a peak magnitude of said first peak portion.

3. The method of claim 1, wherein said determining the width of said first peak portion includes estimating a number of samples which exceed said predetermined threshold.

4. The method of claim 3, wherein said variable width of said first shaping response is indicative of said estimated number of samples which exceed said predetermined threshold.

5. The method of claim 1, wherein said determining the width of said second peak portion includes estimating a number of samples which exceed said predetermined threshold.

6. The method of claim 5, wherein said second shaping response variable width is indicative of said estimated number of samples which exceed said predetermined threshold.

7. The method of claim 1 further including applying a first echo modifier subsequent to application of said first shaping response, said first echo modifier having a variable scale.

8. The method of claim 7 further including varying said first echo modifier variable scale in response to said determined width of said first peak portion.

9. An apparatus for peak-to-average reduction of an oversampled signal in a digital communication system, comprising:
- a buffer having an input adapted to receive said oversampled signal and operable to delay said oversampled signal by a predetermined number of samples;
- a detector coupled to said buffer and operable to determine a first peak portion for said oversampled signal wherein at least a portion of said first peak portion exceeds a predetermined threshold, said detector further operable to estimate a width of said first peak portion and wherein said detector is further operable to estimate a width of said second peak portion which exceeds said predetermined threshold;
- a first modifying unit having an input adapted to receive an indication from said detector of said first peak portion width and operable to apply a variable width first shaping response to said first peak portion width subsequent to said oversampled signal output from said buffer; and
- a second modifying unit having an input adapted to receive an indication from said detector of said second peak portion width and operable to apply a variable width second shaping response to said second peak portion width.

10. The apparatus of claim 9, wherein application of said variable width first shaping response to said first peak portion width results in a first modified peak portion below said predetermined threshold.

11. The apparatus of claim 9, wherein said variable width first shaping response is indicative of said estimated width of said first peak portion.

12. The apparatus of claim 9, wherein said variable width first shaping response further having a variable scale factor determined by a difference of said predetermined threshold and a peak magnitude of said first peak portion.

13. The apparatus of claim 9, wherein said detector further operable to estimate a number of samples of said first peak portion which exceed said predetermined threshold.

14. The apparatus of claim 9, wherein said detector further operable to determine a second peak portion of said oversampled signal wherein at least a portion of said second peak portion exceeds said predetermined threshold.

15. The apparatus of claim 9, wherein said variable width second shaping response is indicative of said estimated width of said second peak portion.

16. A system for peak-to-average reduction of an oversampled signal for a transceiver comprising a transmit portion and a receive portion coupled via a hybrid circuit, said system comprising:
- a buffer having an input adapted to receive said oversampled signal on said transmit portion and operable to delay said oversampled signal by a predetermine number of samples;
- a transmit peak detector coupled to said buffer and operable to determine a first peak portion for said oversampled signal, wherein at least a portion of said first peak portion exceeds a predetermined threshold;
- a modifying unit having an input adapted to receive an indication from said transmit peak detector of said first peak portion and operable to apply a first shape modifier to said first peak portion subsequent to said oversampled signal output from said buffer; and
- a shape canceller coupled to said receiver portion and having an input adapted to receive an indication from said transmit peak detector and operable to apply a variable scale cancellation signal subsequent to application of said first shape modifier
- wherein said modifying unit is further operable to vary a width of said first shape modifier in relation to said estimated width of said first peak portion and said shape canceller is further operable to vary said scale of said cancellation signal in relation to said estimated width of said first peak portion.

17. The system of claim 16, wherein said transmit peak detector is further operable to estimate a width of said first peak portion.

18. A method of peak-to-average reduction of an oversampled signal for a digital communication system, comprising:
- detecting a first peak portion of the oversampled signal that exceeds a predetermined threshold;
- determining a width of said first peak portion;
- applying a first shaping response to said first peak portion, said first shaping response having a variable width;
- varying said first shaping response width responsive to said first peak portion width; and
- applying a first echo modifier subsequent to application of said first shaping response, said first echo modifier having a variable scale.

19. The method of claim 18 further including varying said first echo modifier variable scale in response to said determined width of said first peak portion.

20. A method of processing a signal comprising:
- detecting a plurality of peak portions of the signal that exceed a predetermined threshold;
- determining a width of each one of the plurality of peak portions of the signal;
- applying a corresponding shaping response to each one of the plurality of peak portions of the signal from a plurality of shaping responses, the plurality of shaping responses having a variable width;
- varying the variable widths of the plurality of shaping responses responsive to corresponding width of the plurality of peak portions of the signal.

21. The method of claim 20 further comprising:
- applying a first echo modifier subsequent to application of said corresponding shaping response to each one of the plurality of peak portions of the signal, said first echo modifier having a variable scale; and
- varying said first echo modifier variable scale in response to the corresponding width of each one of the plurality of peak portions of the signal.

* * * * *